US012652351B1

(12) United States Patent
Gentry et al.

(10) Patent No.: US 12,652,351 B1
(45) Date of Patent: Jun. 9, 2026

(54) TECHNIQUES FOR AUTHENTICATION OF ARTIFICIAL INTELLIGENCE (AI) VOICEBOT CALLS

(71) Applicant: Bandwidth Inc., Raleigh, NC (US)

(72) Inventors: William Gentry, Raleigh, NC (US); Ankush Gangwani, Aldie, VA (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 19/289,780

(22) Filed: Aug. 4, 2025

(51) Int. Cl.
　　*H04M 3/436*　　　(2006.01)
　　*H04M 3/22*　　　(2006.01)
　　*H04M 3/42*　　　(2006.01)
(52) U.S. Cl.
　　CPC ......... *H04M 3/436* (2013.01); *H04M 3/2281* (2013.01); *H04M 3/42025* (2013.01)
(58) Field of Classification Search
　　None
　　See application file for complete search history.

(56) References Cited

U.S. PATENT DOCUMENTS

| | | | |
|---|---|---|---|
| 8,817,961 B1 * | 8/2014 | Sterman ............ | H04M 3/42042 379/207.14 |
| 10,535,019 B2 * | 1/2020 | Baracaldo Angel .... | G10L 17/06 |
| 10,681,206 B1 * | 6/2020 | Kreiner ............... | H04M 7/0078 |
| 2008/0181379 A1 * | 7/2008 | Chow ................. | H04L 63/1441 379/142.05 |
| 2021/0377389 A1 * | 12/2021 | Combellas .......... | H04M 3/4365 |
| 2022/0182487 A1 * | 6/2022 | Sharma ............. | H04M 3/42042 |
| 2022/0263942 A1 * | 8/2022 | Hamilton .......... | H04M 3/42042 |
| 2023/0008835 A1 * | 1/2023 | Crume ................... | H04M 3/38 |
| 2023/0088868 A1 * | 3/2023 | Haltom ............. | H04M 3/42059 370/352 |
| 2025/0193308 A1 * | 6/2025 | Lang ..................... | H04M 3/436 |

* cited by examiner

*Primary Examiner* — Quoc D Tran
(74) *Attorney, Agent, or Firm* — Gregory Stephens

(57)　　　　　ABSTRACT
Methods for authenticating VoiceBot calls prior to delivering the VoiceBot calls to a call recipient are provided. The methods include receiving an incoming VoiceBot call at a VoiceBot call processor of an incoming call processing module in communication with network equipment; authenticating the received VoiceBot call at an authentication module in the VoiceBot call processor; and if the VoiceBot call is authenticated, incorporating an indication of authentication into the VoiceBot call such that the indication of authentication is accessible to the call recipient before the VoiceBot call is answered by the recipient. Related systems and computer program products are also provided.

17 Claims, 7 Drawing Sheets

TECHNIQUES FOR AUTHENTICATION OF ARTIFICIAL INTELLIGENCE (AI) VOICEBOT CALLS

FIELD

The present inventive concept relates generally to Voice-Bot calls and, more specifically, to pre-authentication of the VoiceBot calls.

BACKGROUND

Telecommunication customers, for example, mobile subscribers, do not generally like to receive calls or text messages from unknown sources. Some of these unknown sources may actually be SPAM, i.e. unsolicited calls or text messages that are generally sent to a large number of people. Many Carriers, including, Verizon, AT&T, Sprint, and T-Mobile allow reporting of potential SPAM messages. To further complicate this situation, many of these calls are initiated by an artificial intelligence (AI) VoiceBot. A VoiceBot is an AI-powered solution that may interact with customers through spoken language. These VoiceBots can handle tasks like, for example, outbound calls to update order statuses or inbound calls for tech support queries.

Not all VoiceBot calls are SPAM or unwanted. Telecommunication customers may receive VoiceBot calls from doctors, service providers, and the like. Some of these calls may be important, for example, doctor appointment reminders, but are frequently ignored or blocked because they are assumed to be SPAM. Improved processes for evaluating incoming VoiceBot calls are desired.

SUMMARY

Some embodiments of the present inventive concept provide methods for authenticating VoiceBot calls prior to delivering the VoiceBot calls to a call recipient. The methods include receiving an incoming VoiceBot call at a VoiceBot call processor of an incoming call processing module in communication with network equipment; authenticating the received VoiceBot call at an authentication module in the VoiceBot call processor; and if the VoiceBot call is authenticated, incorporating an indication of authentication into the VoiceBot call such that the indication of authentication is accessible to the call recipient before the VoiceBot call is answered by the recipient.

In further embodiments of the present inventive concept, the VoiceBot call may be authenticated by communicating with a centralized authority that issues tokens associated with VoiceBot calls; receiving an authentication token from the centralized authority; and incorporating the authentication token into call control signaling of the VoiceBot call. The indication of authentication may be the authentication token received from the centralized authority.

In still further embodiments, communicating with the centralized authority may be performed in a VoiceBot ecosystem and/or a telephony system associated with the call recipient.

In some embodiments, the method may further include receiving the VoiceBot call having the authentication token associated therewith; communicating with the centralized authority to assess legitimacy of the incoming VoiceBot call; and if authenticated, delivering the VoiceBot call to the call recipient with an indication that the VoiceBot call has been authenticated.

In further embodiments, the method may further include communicating with the centralized authority to assess legitimacy of the incoming VoiceBot call from a device associated with the recipient.

In still further embodiments, the VoiceBot call may be delivered to the call recipient without an indication of authentication if the VoiceBot call is not authenticated.

In some embodiments, the VoiceBot call may be authenticated by formulating a flag indicating that the VoiceBot call is authenticated. The indication of authentication may be the flag. The flag may be included in call control signaling of the VoiceBot call.

In further embodiments, the flag may be formulated the flag in a VoiceBot ecosystem and/or a network associated with the call recipient.

In still further embodiments, the VoiceBot call may be received having the flag. The flag may be recognized as an indication of authentication and the VoiceBot Call may be delivered to the call recipient if the flag is recognized.

In some embodiments, the receiving, recognizing and delivering may be performed at a device associated with the call recipient.

In further embodiments, the VoiceBot call may be authenticated by depositing a credential for the VoiceBot call in a centralized network database. It may be verified that the credential is present in the centralized network database before delivering the VoiceBot call to the recipient. The indication of authentication may be the presence of the credential in the centralized network database.

In still further embodiments, the verification of the credential may be performed at a device associated with the recipient.

In some embodiments, before the VoiceBot call is received, the VoiceBot call is initiated in a VoiceBot ecosystem and delivered to the VoiceBot call processor.

In further embodiments, the VoiceBot call processor may be located in a telephony network associated with the recipient and/or in a VoiceBot ecosystem.

Related systems and computers are also provided.

DETAILED DESCRIPTION OF EMBODIMENTS

Figure 1:
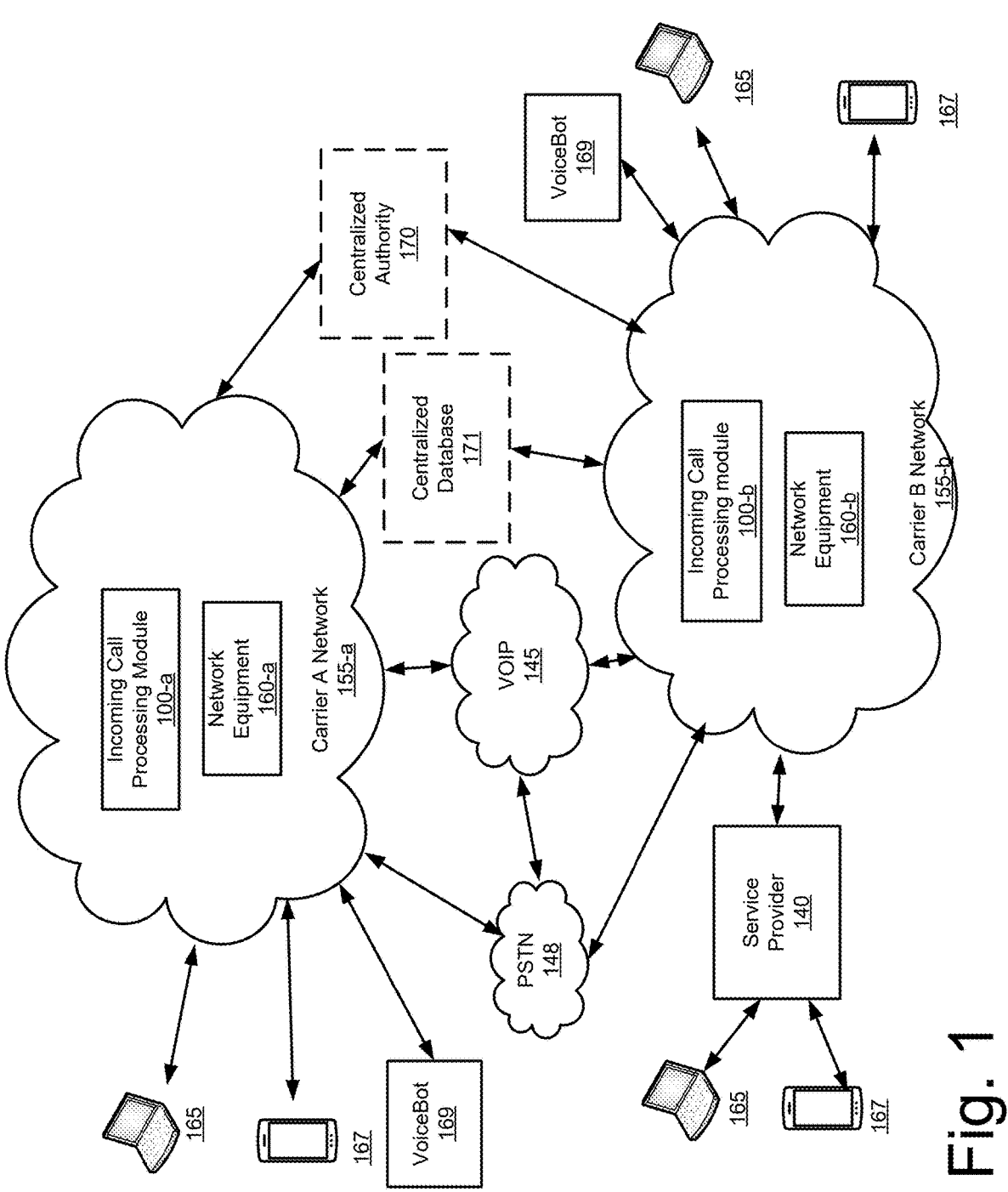
FIG. 1 is a block diagram illustrating a network including an incoming call processing module for VoiceBot calls in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As used herein, a "VoiceBot call" refers to a call made by an artificial intelligence (AI)-powered solution that may interact with customers through spoken language on a call. These VoiceBots can handle tasks like, for example, outbound calls to update order statuses or inbound calls for tech support queries. Similarly, "human agent" refers to a human actor. VoiceBot call implies a call that is initiated by the VoiceBot system or ecosystem. Thus, when discussing authentication herein, the phrases authenticating the VoiceBot call and authenticating the VoiceBot system may be used interchangeably.

Embodiments discussed herein may refer to a telephony network. Generally, the telephony network refers to the telephony network serving the called party or call recipient. However, any telephony network may be contemplated without departing from the scope of the present inventive concept.

As discussed briefly above, VoiceBot calls are becoming more prevalent, however, there is some level of resistance to dealing directly with an AI voice agent ("VoiceBot") that initiates a voice session. This can apply to scenarios where a voice session is offered directly to a human, as well as to scenarios where the voice session is received by another VoiceBot, for example, interactive voice response (IVR) or a conversational AI system. It is not generally unusual for either type of receiving agent to screen or block such calls, perhaps with the impression that the call is coming from a "robocaller" or that it may have been initiated with some type of fraudulent intention.

As society moves towards integrating AI, this may become a bigger problem in the telecommunication industry specifically as VoiceBots play a greater role in these types of interactions. In particular, legitimate enterprises will likely leverage AI VoiceBots instead of human agents for many types of outreach, especially as the interaction with the AI VoiceBot grows to better equate to the same experience with a human agent. Likewise, individual consumers will also likely leverage personal AI VoiceBot assistants to take care of communication tasks that currently require their own or another human's involvement, such as making appointments, purchasing tickets, or making childcare arrangements. In each case, the ability to authenticate AI VoiceBots and confirm these VoiceBots are participating in legitimate business or personal functions is critical to make all of these interactions more effective.

Accordingly, some embodiments of the present inventive concept provide various methods, systems and computer program products that may be used to authenticate a virtual AI agent that is involved in a voice session, and provide a way to communicate the authentication to the recipient of the voice session, so that the recipient can have knowledge and factor that knowledge into how they handle the interaction with the incoming call, for example, whether the recipient answers/accepts the call or not.

In particular, some embodiments of the present inventive concept provide methods, systems and computer program products for addressing the authentication of VoiceBot calls discussed above. For example, some embodiments include a centralized authority (clearing house) that can be used to authenticate an AI VoiceBot as a legitimate calling party. Further embodiments discuss self-authentication using an in-band signaling mechanism. Still further embodiments discuss self-authentication using an out-of-band signaling mechanism. Details with respect to these various embodiments will be discussed further with reference to the accompanying figures.

Referring now to FIG. 1, a block diagram illustrating an example system 101 according to some embodiments of the present inventive concept will be discussed. As illustrated, the system 101 includes a voice over internet protocol (VOIP) network 145; a public switched telephone network (PSTN) 148; a plurality of Carrier networks, for example, Carrier A Network 155-a and Carrier B Network 155-b; a service provider 140; a plurality of endpoints 165, 167 and 169 in communication with the Carrier Networks 155-a and 155-b and the service provider 140; a centralized authority 170 and a centralized database 171. The centralized authority 170 and the centralized database 171 are shown in dotted lines as these elements are optional components of the system 10, some embodiments of the present inventive concept operate without a central authority 170 and/or a centralized database 171. Although only two Carriers are illustrated in FIG. 1, it will be understood that one Carrier or more than two Carriers may be present in the system without departing from the scope of the present inventive concept.

The VoIP network 145 is provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the PSTN. The PSTN network 148 is an aggregate of the world's circuit-switched telephone networks that are operated by national, regional, or local telephony operators, providing infrastructure and services for public telecommunication. The network 145 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

The plurality of endpoints may include an internet of things (IoT) endpoint 165, a telephony endpoint 167 and/or a VoiceBot endpoint 169. The IoT endpoint 165 may include an end user device such as a personal computer (PC), security system or component, heating, ventilation, and air conditioning (HVAC) system or component, automotive device, audio device, smart refrigerator, smart stove, smart television, and the like. The telephony endpoint 167 may be a mobile device such as cell phone, smartphone, laptop, VOIP phone, IoT device, or another telephonic device. The VoiceBot endpoint 169 may include any of the devices discussed with respect to the telephony endpoint 167 of the IoT endpoint 165, but also includes the VoiceBot "ecosystem." As used herein, the VoiceBot "ecosystem" refers to, for example, an enterprise-based Unified Communications Platform; an enterprise-based Contact Center Platform; and/or an end-user-based platform, that may be running a mobile device or personal computer or tablet. It is understood that these are provided as examples only and that embodiments of the present inventive concept are not limited thereto. Any system that can initiate a VoiceBot voice session can define the VoiceBot ecosystem. The endpoints 165, 167 and 169 communicate through the networks 145 and 148 and the Carriers 155-*a* and 155-*b*.

As used herein, the term a "telecommunications Carrier" may refer to any provider of telecommunications services. FIG. 1 also includes a service provider 140. It will be understood that a Carrier, such as Carrier A and B in FIG. 1 may be a service provider, for example, Bandwidth, Verizon, AT&T and the like. However, the reverse is not true, a service provider 140 is not necessarily a Carrier. In embodiments where the service provider 140 is not a Carrier, the service provider 140 may be a customer of the Carrier. FIG. 1 illustrates, the service provider 140 being a customer of Carrier B 155-*b*. It will be understood that although the service provider 140 is shown as only being a customer of Carrier B 155-*b*, embodiments of the present inventive concept are not limited thereto. The service provider 140 may be customer of other Carriers or there may be additional service providers in the system 101 without departing from the scope of the present inventive concept.

As further illustrated in FIG. 1, each Carrier Network 155-*a* and 155-*b* may include network equipment 160-*a* and 160-*b* and an incoming call processing module 100-*a* and 100-*b*, respectively, in accordance with embodiments discussed herein. Although not shown FIG. 1, these modules may also be present in other elements of the system 101. For example, these elements may be present at a direct Carrier aggregator (DCA) or a content service provider (CSP) and the like without departing from the scope of the present inventive concept. The network equipment 160-*a* and 160-*b* may illustrate any hardware used to send, receive, and route calls at the Carrier Network 155-*a* and 155-*b*.

As further illustrated in FIG. 1, in some embodiments, the Carrier Networks 155-*a* and 155-*b* are in communication with the centralized authority 170 and/or the centralized database 171. Although not shown, the centralized authority 170 and the centralized database 171, if present, can communicate with any of the components of the system without departing from the scope of the present inventive concept. If present, the centralized authority 170 plays a role in authorizing the various attributes associated with the VoiceBot calls that are delivered to the recipient. In these embodiments, the VoiceBot ecosystem or its associated telephony network interacts with the centralized authority 170 to establish a credential which may take the form of, for example, a certificate or token. This credential may be included with the call control signaling used to establish a voice session as will be discussed further below. For example, this credential may be delivered with the call control signaling to the recipient's telephony network or the recipient's device, which in turn interfaces with the centralized authority 170 to authenticate the credential before passing the associated attributes along to the recipient.

The centralized database/repository 171 may be used, for example, in an out-of-band signaling mechanism to deliver authentication information to the call recipient, independent of the information that is delivered within call control signaling for the voice session. The out-of-band mechanism leverages centralized database 171 where a credential can be deposited whenever the VoiceBot initiates a voice session. When the recipient receives the VoiceBot call (voice session), it may independently query the centralized database 171 in order to determine if information about this specific VoiceBot call has been stored in the centralized database 171. If a credential is found, then the VoiceBot call may be considered authenticated, and will be presented as authenticated to the call recipient. Further details with respect to these embodiments will be discussed further below.

The incoming call processing module 100-*a* and 100-*b* (at the recipient's telephony network) may provide methods, systems and computer program products for processing the VoiceBot calls to the call recipient, which involves authenticating the VoiceBot calls for the recipient as will be discussed further below. For example, when an incoming VoiceBot call is received at the incoming call processing module 100-*a* and 100-*b*, the incoming call may be screened for flags, tokens and the like and these flags, tokens and the like may be used to authenticate the VoiceBot call before forwarding the call to the call recipient. If the VoiceBot call is authenticated, this may be communicated to the recipient, which may increase the likelihood that the recipient will answer the VoiceBot call. In some embodiments, the screening and authentication of the incoming VoiceBot call may be offered as a service to customers to enable prescreening of calls from a VoiceBot to avoid missing important calls from, for example, service providers, doctors' offices, and the like.

Figure 2:
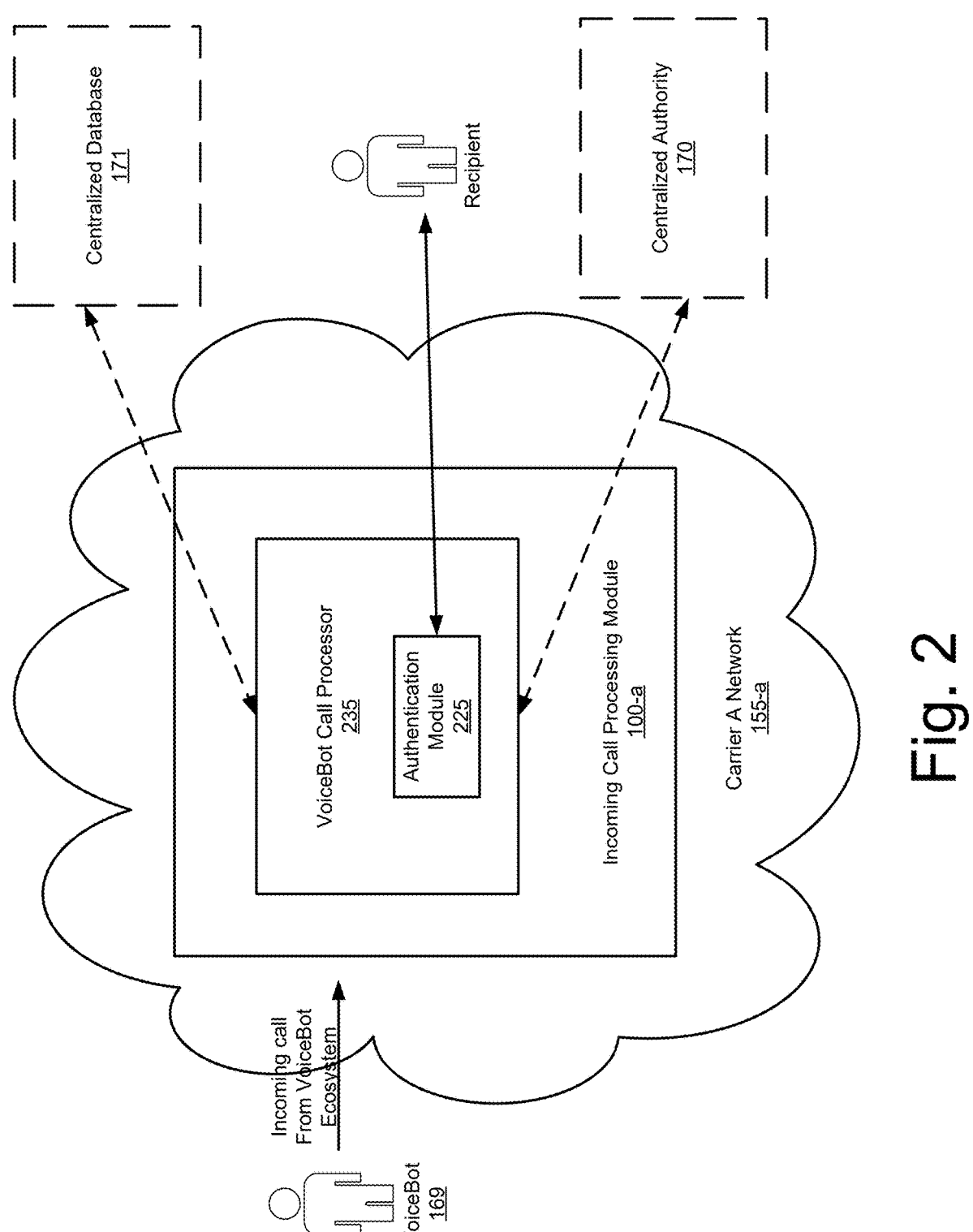
FIG. 2 is a block diagram illustrating details associated with incoming call processing module from a VoiceBot ecosystem in accordance with some embodiments of the present inventive concept.

Referring now to FIG. 2, a block diagram illustrating operations of the Incoming Call Processing Module 100-*a* in accordance with some embodiments of the present inventive concept will be discussed. Operations in accordance with some embodiments of the present inventive concept will now be discussed with respect to FIGS. 1 and 2.

As illustrated in FIG. 2, in some embodiments of the present inventive concept, the VoiceBot 169 initiates a voice session within the VoiceBot ecosystem. As discussed above, the VoiceBot ecosystem may include an enterprise-based Unified Communications Platform; an enterprise-based Contact Center Platform; and/or an end-user-based platform, that may be running a mobile device or personal computer or tablet. The VoiceBot ecosystem delivers the voice session to the incoming call processing module 100-*a* in the Voice-Bot ecosystem or associated a recipient's telephony carrier network. A VoiceBot call processor 235 receives the incoming VoiceBot Call and processes the call to determine if the call can be authenticated 225. If the call can be authenticated, the call processing module may deliver the call to the recipient indicating that the VoiceBot call has been authenticated, which increases the likelihood that the recipient may answer the call. If the VoiceBot call cannot be authenticated, the call is still delivered to the user but no authorization may be provided.

As illustrated in FIG. 2, in some embodiments that authorization process may include the user of a centralized authority 170 and/or centralized database 171. However, the centralized authority 170 and the centralized database 171 are optional and can be removed from the system without departing from the present inventive concept. It will be understood that embodiments illustrated in FIG. 2 are provided as an example only and embodiments are not limited thereto.

Figure 3:
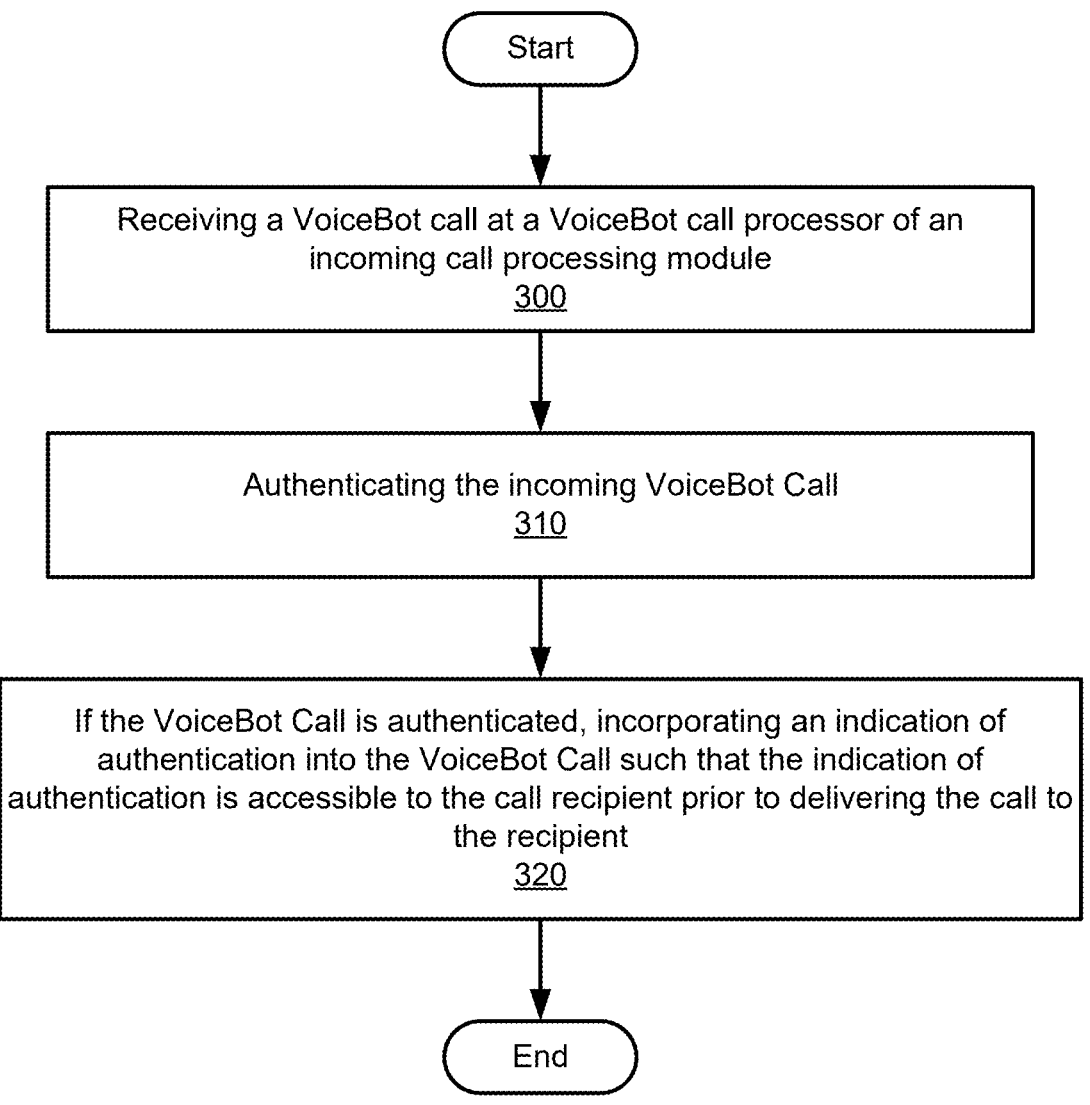
FIGS. 3 through 6 are flowcharts illustrating operations for processing incoming VoiceBot calls in accordance with various embodiments of the present inventive concept.

Various embodiments of the present inventive concept will now be discussed with respect to the flowcharts of FIGS. 3 through 6. Referring first to FIG. 3, a basic flow illustrating operations in accordance with some embodiments of the present inventive concept will now be discussed. As illustrated in FIG. 3, operations for authenticating VoiceBot calls prior to delivering the VoiceBot calls to a call recipient begin at block 300 by receiving an incoming VoiceBot call. In some embodiments, the VoiceBot call may be received at a VoiceBot processor 235 of an incoming call processing module in communication with network equipment. The VoiceBot processor 235 may be in the VoiceBot ecosystem and/or a telephony network associated with the call recipient without departing from the scope of the present inventive concept. Once the call has been received (block 300), the received VoiceBot call undergoes an authentication process, which may occur at the authentication module 225 in some embodiments. As discussed above with respect to the VoiceBot Call processor 235, the authentication module 225 may be located in the VoiceBot ecosystem, the telephony network associated with the call recipient or any combination of the two. The authentication process in accordance with embodiments discussed herein may be performed in various ways, each of which will be discussed further below. For example, some of these authentication processes include the use of tokens, flags, certifications and the like that allow the user to discern that the incoming VoiceBot call has been authenticated. These authentication processes may be performed in band or out of band without departing from the scope of the present inventive concept. For example, in some embodiments, operation may proceed to block 320 where, if the VoiceBot call is authenticated (block 310), an indication of authentication may be provided to the call recipient. This indication of authentication (flag, token etc.) may be accessible to the call recipient before the VoiceBot call is answered by the recipient. For example, in some embodiments, a token obtained from a centralized authority may be incorporated into call control signaling of the VoiceBot call. This token may be used downstream by the telephony network of the recipient's device to authenticate the VoiceBot call/VoiceBot system. A notification of authentication delivered to the user with the incoming VoiceBot call may increase the likelihood that the user will answer the call.

Figure 4:
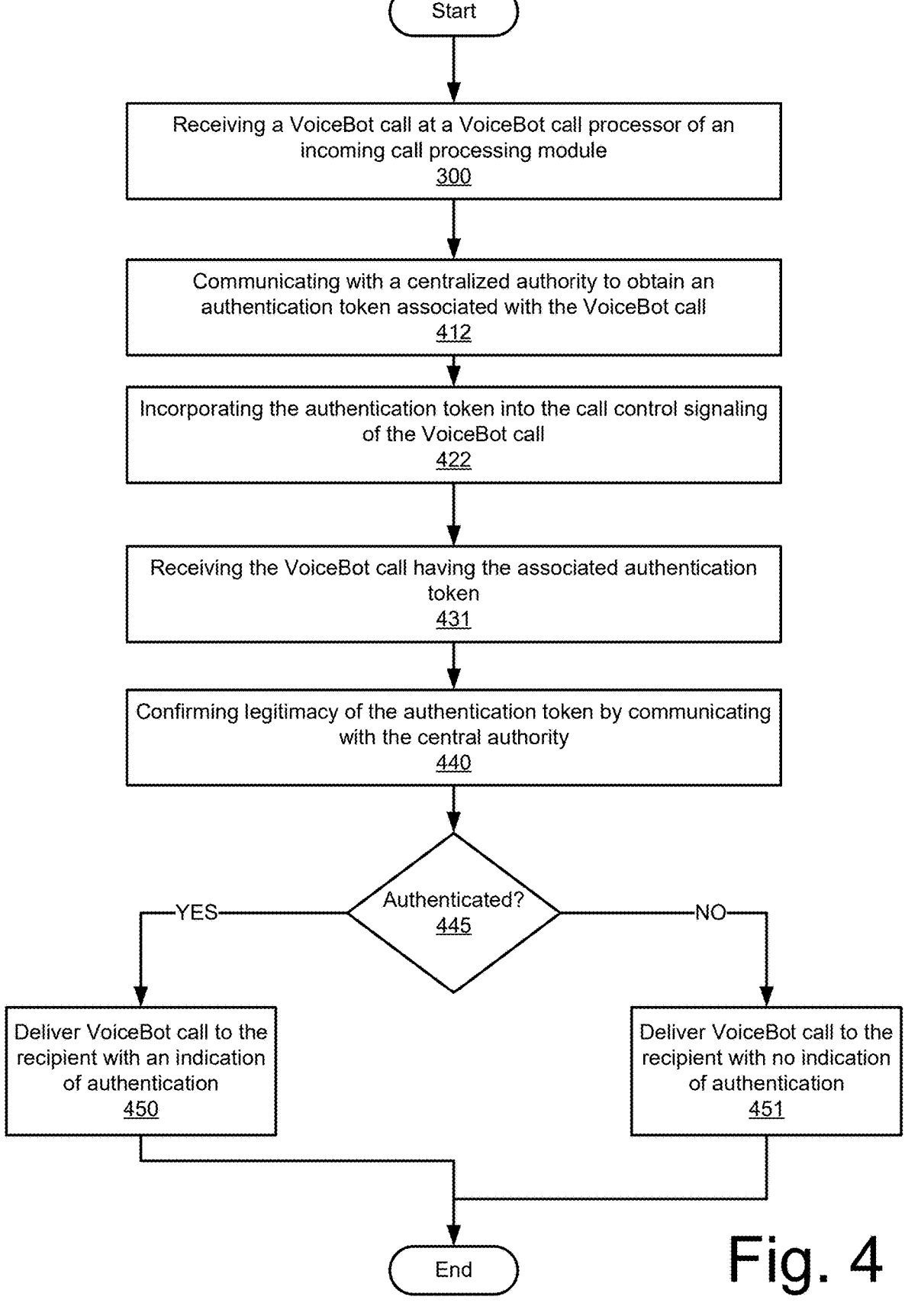

Referring now to the flowchart of FIG. 4, operations of embodiments of the present inventive concept utilizing a centralized authority will be discussed. As illustrated in FIG. 4, operations for authenticating VoiceBot calls prior to delivering the VoiceBot calls to a call recipient begin at block 300 by receiving an incoming VoiceBot call. It will be understood that prior to receiving the VoiceBot call, the VoiceBot Call must be initiated and delivered. The VoiceBot call may be initiated and delivered in many ways all of which are within the scope of the present inventive concept. Upon receiving the VoiceBot call, the VoiceBot ecosystem and/or the telephony network associated with the call recipient instantiates an authentication token with the centralized certificate authority. In other words, the relevant entity communicates with the centralized authority to obtain the authentication token associated with the VoiceBot call (block 412). Thus, in these embodiments, the "indication of authentication" is the authentication token received from the centralized authority.

The authentication token is then included in the call control signaling of the VoiceBot call (block 422). The telephony system associated with the recipient receives the VoiceBot call having the authentication token associated therewith (block 431) and communicates with the centralized authority to ensure the incoming VoiceBot call is authenticated (block 440). It will be understood that in some embodiments, this authentication exchange with the centralized authority may occur at the recipient's device and thus is not limited to the telephony network. If authenticated (block 445), the VoiceBot call is delivered to the call recipient with an indication that the VoiceBot call has been authenticated (block 450). If, on the other hand, the VoiceBot call is not authenticated (block 445), the VoiceBot call may be delivered to the recipient without an indication of authentication. If the call recipient answers, two-way communication may be enabled.

Embodiments of the present inventive concept discussed with respect to the flowchart of FIG. 4 leverage the concept of authentication tokens to encapsulate identifying credentials associated with a specific VoiceBot. The credentials may identify various attributes of the AI VoiceBot, including some/all of the following: (i) the entity responsible for managing and operating the AI VoiceBot; the type of use case that the AI VoiceBot is responsible for implementing; validity duration; industry-based Certificate Authority serves to authenticate the various token/attributes and the like.

Thus, as discussed, in some embodiments, the authentication token may be created within the telephony network associated with the recipient. In particular, the associated telephony network establishes the token with the centralized authority (on behalf of the VoiceBot and its ecosystem) and includes it in the call control signaling sent to the recipient's voice telephony network. This embodiment is an example of "in-band communication of the authentication." The token is incorporated into the call control signaling between the VoiceBot's associated telephony network and the recipient's voice telephony network. The recipient voice telephony network communicates with the centralized authority to authenticate the token that is received. The voice session is delivered to the recipient as having come from an authenticated VoiceBot.

However, in further embodiments, the authentication token may be created in the VoiceBot ecosystem. These embodiments leverage the concept of authentication tokens to encapsulate identifying credentials associated with the specific party. Although similar to the embodiment discussed above, in these embodiments the VoiceBot ecosystem interfaces to the centralized authority to instantiate the authentication token before the voice session is delivered to the associated telephony network. The VoiceBot ecosystem delivers the authentication token in the call control signaling of the voice session to the associated telephony network, which in turn proxies it to the recipient's voice telephony network.

It will be understood that in some embodiments, the recipient's authentication may be performed directly on the recipient's device, as opposed to being performed by the recipient's voice telephony network. In other words, regardless of how the credential is deposited in the centralized authority, the recipient's device may be responsible for retrieving the token from the centralized authority and using that to authenticate the VoiceBot involved in the voice session.

Figure 5:
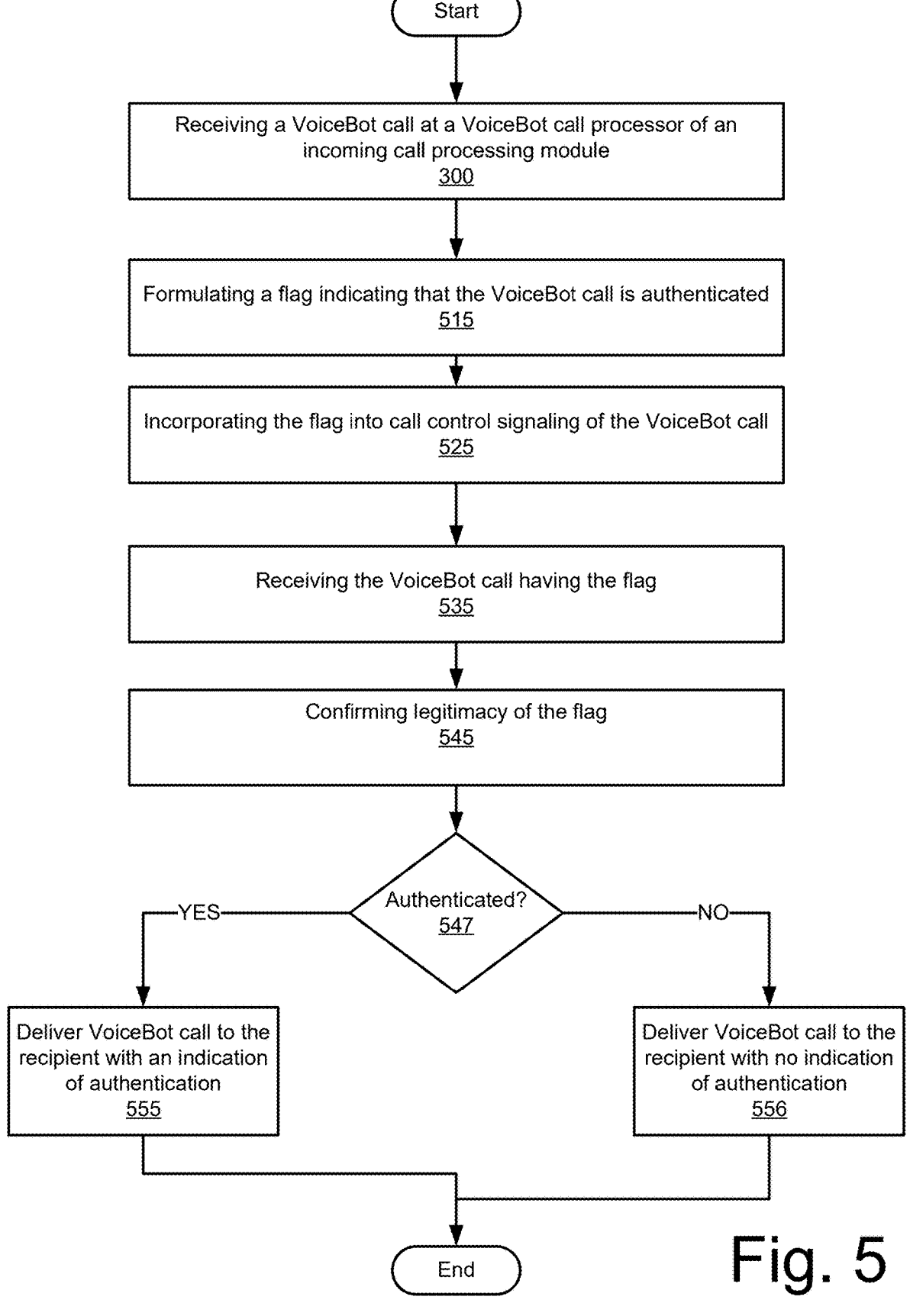

Referring now to FIG. 5, operations for self-authentication using an in-band signaling mechanism will be discussed. This implementation involves the definition of authentication information discretely within either the VoiceBot ecosystem or the associated telephony network and communicating this directly to the recipient's telephony network or the recipient's device in some embodiments. This implementation is based on a level trust between the various telephony networks in the data flag/parameter(s) that are communicated surrounding the VoiceBot and its attributes. The recipient's voice telephony network leverages the embedded flag/parameter(s) to authenticate the VoiceBot to the recipient.

As illustrated in FIG. 5, operations begin at block 300 by receiving a VoiceBot call. It will be understood that prior to receiving the VoiceBot call, the VoiceBot Call must be initiated and delivered. The VoiceBot call may be initiated and delivered in many ways all of which are within the scope of the present inventive concept. To authenticate the VoiceBot call, a flag/parameter may be formulated indicating that the VoiceBot call is authenticated (block 515). The formulation of the flag/parameter may be performed at the telephony network and/or in the VoiceBot ecosystem without departing from the scope of the present inventive concept. The flag is incorporated into the call control signaling of the VoiceBot call (block 525). The VoiceBot call having the flag is received (535) and the legitimacy of the flag is confirmed (block 545). If authenticated (block 547), the VoiceBot Call is delivered to the call recipient and the VoiceBot call is indicated as authenticated (block 555). If the flag is not authenticated (block 547), the VoiceBot Call is delivered without an indication of authentication (block 556). If the recipient answers, two way communication may be enabled.

As discussed above, some embodiments illustrated in FIG. 5 create the flag within the associated telephony network. These embodiments leverage the software concept of a flag or protocol parameter to associate attribute(s) with the voice session which stipulate that it has a legitimate origin. The VoiceBot ecosystem delivers the voice session to the associated telephony network. The associated telephony network authenticates the call was received by an authorized VoiceBot from its ecosystem. From there, a flag or special parameter is added to the call control signaling that is delivered to the recipient's telephony network. It will be understood that as used herein the "flag/parameter" can include any number of attributes associated with the Voice-Bot, including: (i) the entity responsible for managing and operating the AI VoiceBot; (ii) the type of use case that the AI VoiceBot is responsible for implementing; (iii) validity duration and the like. The recipient's voice telephony network recognizes the flag/parameter that is included in the call control signaling and the voice session is delivered to the recipient as having come from an authenticated Voice-Bot.

In further embodiments, the flag/parameter may be created in the VoiceBot ecosystem. These embodiments are similar to the previous one with the exception that the VoiceBot ecosystem creates the flag/parameter associated with the VoiceBot and includes it in the call control signaling that is passed to the associated telephony network to initiate the voice session. These embodiments leverage the concept of a flag or protocol parameter to associate attribute(s) with the voice session which stipulate that it has a legitimate origin.

In particular, the VoiceBot ecosystem creates the flag/parameter that is included in the call control signaling that is delivered to the associated telephony network. The associated telephony network authenticates the voice session to establish a level of trust associated with the information included in the call control signaling, including the flag/parameter associated with the VoiceBot attributes. Based on that, the flag/parameter is proxied within the call control signaling that is delivered to the recipient's telephony network. The recipient's voice telephony network recognizes the flag/parameter that is included in the call control signaling. Based on the explicit level of trust with information communicated between the two telephony networks, the information is used to authenticate the VoiceBot that is initiating the voice session. The voice session is delivered to the recipient as having come from an authenticated Voice-Bot.

Referring now to the flowchart of FIG. 6, operations for embodiments of the present inventive concept using self-authentication using out of band signaling will be discussed. This implementation involves an out-of-band signaling mechanism to deliver authentication information to the recipient, independent of the information that is delivered within call control signaling for the voice session. The out-of-band mechanism leverages an independent repository (such as a centralized database) where a credential can be deposited whenever the VoiceBot initiates a voice session. When the recipient receives the voice session, it will independently query the centralized database in order to determine if information about this specific call has been stored in the centralized database. If a credential is found, then the VoiceBot will be considered to be authenticated, and will be presented as such to the recipient.

Figure 6:
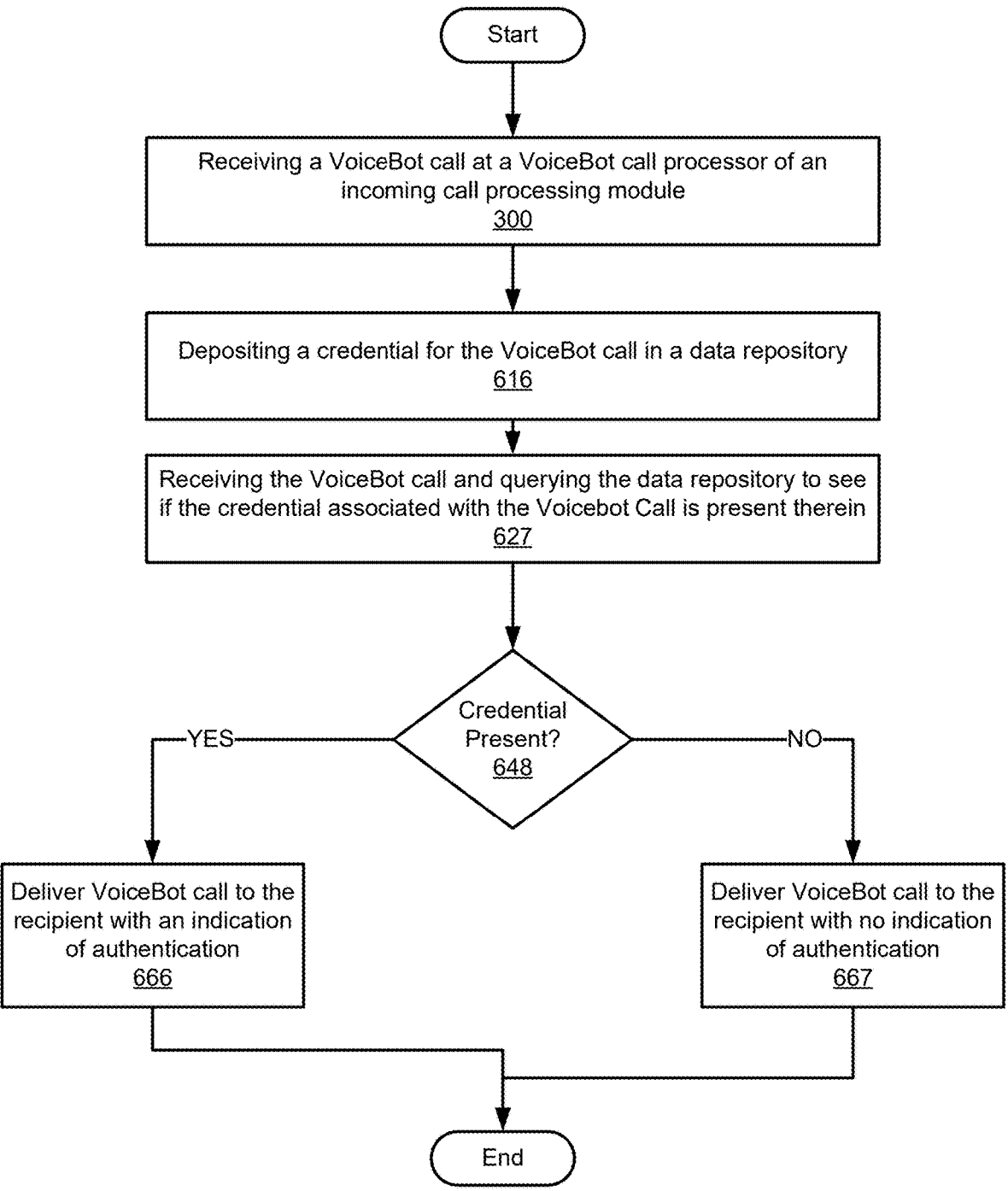

As illustrated in FIG. 6, operations begin at block 300 by receiving a VoiceBot call. It will be understood that prior to receiving the VoiceBot call, the VoiceBot Call must be initiated and delivered. The VoiceBot call may be initiated and delivered in many ways all of which are within the scope of the present inventive concept. A credential associated with the received VoiceBot call may be deposited in a central network database (block 616). This deposit can be done by the telephony network and/or the VoiceBot Ecosystem as discussed in detail below. Once the VoiceBot call is received by the telephone network associated with the recipient, it queries the network database to see if the credential associated with the VoiceBot call is present in the network database (block 627). If the credential is present (block 648), the VoiceBot Call is delivered to the call recipient and the VoiceBot call is indicated as authenticated (block 666). If the credential is not present (block 648), the VoiceBot Call is delivered without an indication of authentication (block 667). If the call is answered, two-way communication may be established.

As discussed above, the credential may be deposited in the network database by the telephony network or the VoiceBot ecosystem. The various embodiments will now be discussed. The associated telephony network may deposit a credential in the network database for the authenticated VoiceBot involved in the call. These embodiments leverages a database within the network to record key attributes associated with the VoiceBot on each outbound voice session. The network database can be queried and authenticated by the recipient's telephony network. These attributes can include some/all, but are not limited to, the following: (i) The entity responsible for managing and operating the AI VoiceBot; (ii) the type of use case that the AI VoiceBot is responsible for implementing; (iii) validity duration and the like.

As discussed above, the associated telephony network updates the industry database each time an outbound voice session is initiated. This update can be performed in any one of a variety of ways, including hypertext transfer protocol (HTTP)/HTTP secure (HTTPS) Application Programming Interfaces (APIs), session initiation protocol (SIP), or other signaling protocols without departing from the scope of the present inventive concept. The outbound voice session is routed through the telephony network to the recipient's voice telephony network. It will be understood that since this is an out-of-band signaling, unlike some embodiments discussed above, there is not any reference to the VoiceBot or the credential in the associated call control signaling.

Once the call is received, the recipient's voice telephony network queries the network database to authenticate the VoiceBot call and retrieve associated attributes associated with it. Examples of parameters that may play a role in this query include (but are not limited to): (i) calling party identity/Number; (ii) called party identity/number; (iii) timestamp of the voice session and the like. If present, the call is delivered to the recipient as having come from an authenticated VoiceBot.

In further embodiments, the VoiceBot ecosystem, rather than the telephony system, deposits a credential in the network database for the authenticated VoiceBot involved in the call. Similar to embodiments discussed above, these embodiments leverage the database within the network to record key attributes associated with the VoiceBot on each outbound voice session, which can be queried and authenticated by the recipient's telephony network. The VoiceBot ecosystem updates the network database each time an outbound voice session is initiated. This update can be performed in any one of a variety of ways, including HTTP/HTTPS APIs, SIP, or other signaling protocols. The Voice session is delivered to the Associated Telephony Network. The outbound voice session is routed by the Associated Telephony Network to the Recipient's voice telephony network. The Recipient's voice telephony network queries the industry database to authenticate the VoiceBot and retrieve associated attributes associated with it. The call is delivered to the recipient as having come from an authenticated VoiceBot.

In some embodiments the recipient authentication is performed on the recipient's device. Thus, operations proceed with use of the database as discussed above, however, the recipient's authentication is performed directly by the recipient's device, as opposed to being performed by the recipient's voice telephony network. Regardless of how the credential is deposited in the centralized database, the recipient's device is responsible for retrieving the credential from the network database and using that to authenticate the VoiceBot/VoiceBot call involved in the voice session.

Figure 7:
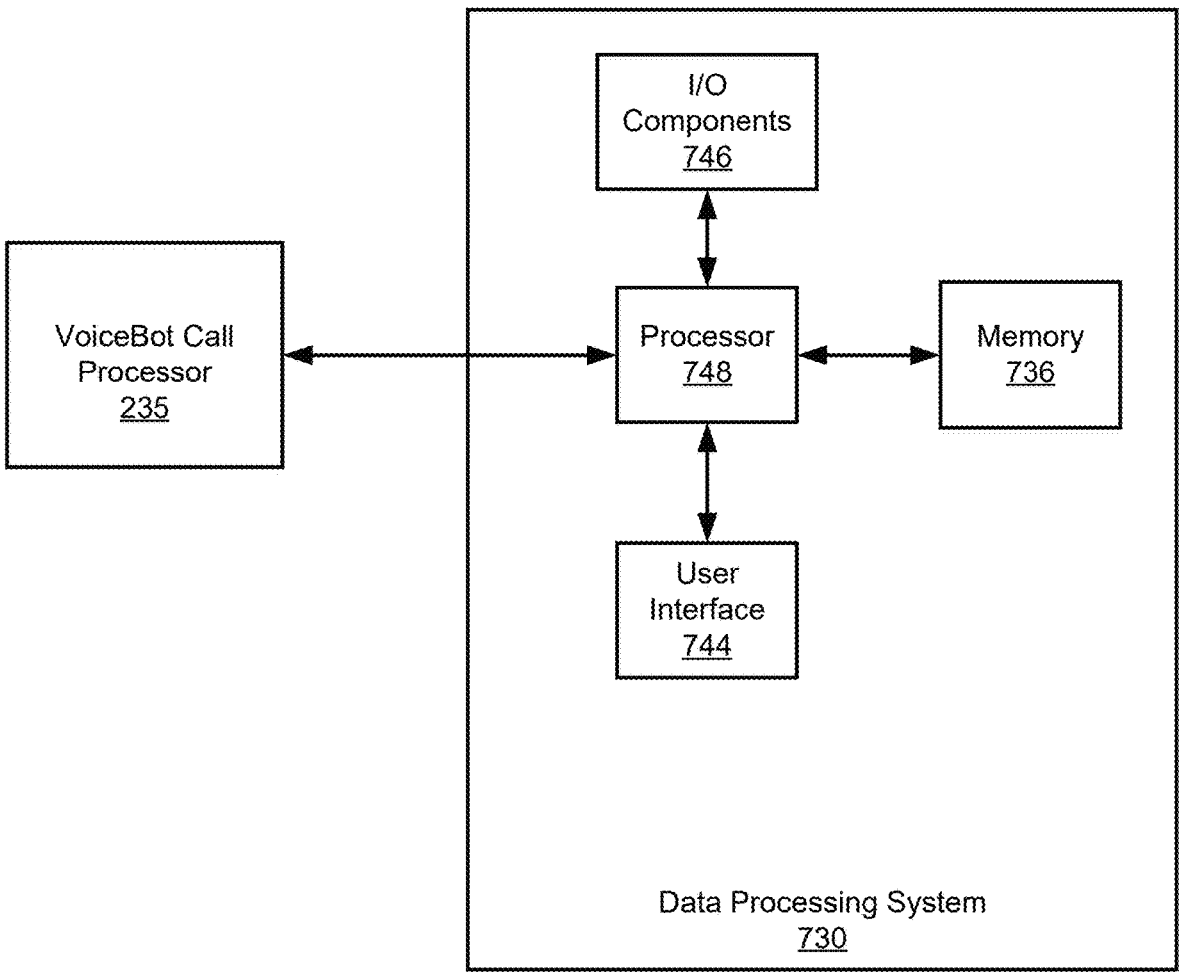
FIG. 7 is a block diagram of a data processing system for use in accordance with some embodiments of the present inventive concept.

Referring now to FIG. 7, an example of a data processing system 730 suitable for use with any of the examples described above. Although the example data processing system 730 is shown as in communication with a VoiceBot call processor in accordance with embodiments of the present inventive concept, the data processing system 730 may also be part of the incoming call processing module or in any other component of the system 101 without departing from the scope of the present inventive concept. In some examples, the data processing system 730 can be any suitable computing device for performing operations according to the embodiments discussed herein.

As illustrated, the data processing system 730 includes a processor 748 communicatively coupled to I/O components 746, a user interface 744 and a memory 736. The processor 748 can include one or more commercially available processors, embedded processors, secure processors, microprocessors, dual microprocessors, multi-core processors, other multi-processor architectures, another suitable processing device, or any combination of these. The memory 736, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 730.

I/O components 746 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storages such as magnetic, optical, or other storage media included in the data processing system and/or coupled to processor 748.

The user interface 744 may include, for example, a keyboard, keypad, touchpad, voice activation circuit, display or the like and the processor 748 may execute program code or instructions stored in memory 736.

It should be appreciated that data processing system 730 may also include additional processors, additional storage, and a computer-readable medium (not shown). The processor(s) 748 may execute additional computer-executable program instructions stored in memory 736. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above with respect to FIGS. 1 through 7, some embodiments of the present inventive concept provide methods and systems that authenticate an AI VoiceBot as a calling party. The called party can use information provided about an authenticate/unauthenticated call to determine an appropriate method for screening or allowing the AI VoiceBot calls based on the authentication.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for authenticating VoiceBot calls prior to delivering the VoiceBot calls to a call recipient, wherein a VoiceBot call is a call made by an artificial intelligence (AI)-powered solution that interacts with users through spoken language on a call, the method comprising:

receiving an incoming VoiceBot call at a VoiceBot call processor of an incoming call processing module in communication with network equipment;

authenticating the received VoiceBot call at an authentication module in the VoiceBot call processor; and if the VoiceBot call is authenticated, incorporating an indication of authentication into the VoiceBot call such that the indication of authentication is accessible to the call recipient before the VoiceBot call is answered by the recipient, wherein the indication of authentication indicates legitimacy of the VoiceBot call, wherein the incoming call processing module further communicates with a centralized authority and/or a centralized network database, the centralized authority authorizes various attributes associated with the VoiceBot call to provide the indication of authentication to the call recipient and the centralized network database delivers the indication of authentication to the call recipient using out-of-band signaling to deliver the indication of authentication to the recipient separate from information delivered within call control signaling.

2. The method of claim 1, wherein authenticating comprises:

communicating with the centralized authority that issues tokens associated with VoiceBot calls, wherein the centralized authority communicates with a VoiceBot ecosystem or an associated telephony network to establish a credential that takes the form of the issued tokens;

receiving an authentication token from the centralized authority; and incorporating the authentication token into call control signaling of the VoiceBot call, wherein the indication of authentication comprises the authentication token received from the centralized authority.

3. The method of claim 2, wherein communicating with the centralized authority is performed in a VoiceBot ecosystem associated with the call recipient.

4. The method of claim 3, further comprising:

receiving the VoiceBot call having the authentication token associated therewith;

communicating with the centralized authority to assess legitimacy of the incoming VoiceBot call; and if authenticated, delivering the VoiceBot call to the call recipient with an indication that the VoiceBot call has been authenticated.

5. The method of claim 4, wherein communicating further comprises communicating with the centralized authority to assess legitimacy of the incoming VoiceBot call from a device associated with the recipient.

6. The method of claim 4, further comprising, if the VoiceBot call is not authenticated, delivering the VoiceBot call to the call recipient without an indication of authentication.

7. The method of claim 1, wherein authenticating comprises:

formulating a flag indicating that the VoiceBot call is authenticated, wherein the indication of authentication comprises the flag; and including the flag in call control signaling of the VoiceBot call.

8. The method of claim 7, wherein formulating the flag comprises formulating the flag in a VoiceBot ecosystem and/or a network associated with the call recipient.

9. The method of claim 7, further comprising:

receiving the VoiceBot call having the flag;

recognizing the flag as an indication of authentication; and delivering the VoiceBot Call to the call recipient if the flag is recognized.

10. The method of claim 9, wherein the receiving, recognizing and delivering is performed at a device associated with the call recipient.

11. The method of claim 1, wherein authenticating comprises:

depositing a credential for the VoiceBot call in the centralized network database; and verifying that the credential is present in the centralized network database before delivering the VoiceBot call to the recipient, wherein the indication of authentication comprises presence of the credential in the centralized network database.

12. The method of claim 11, wherein the verifying is performed at a device associated with the recipient.

13. The method of claim 1, wherein receiving is preceded by:

initiating the VoiceBot call in a VoiceBot ecosystem; and delivering the incoming call to the VoiceBot call processor.

14. The method of claim 1, wherein the VoiceBot call processor is located in a telephone network associated with the recipient and/or in a VoiceBot ecosystem.

15. A system for authenticating VoiceBot calls prior to delivering the VoiceBot calls to a call recipient, wherein a VoiceBot call is a call made by an artificial intelligence (AI)-powered solution that interacts with users through spoken language on a call, the system comprising:

a processor; and a non-transitory computer readable medium to store a set of instructions for execution by the processor, the set of instructions to cause the processor to:

receive an incoming VoiceBot call at a VoiceBot call processor of an incoming call processing module in communication with network equipment;

authenticate the received VoiceBot call at an authentication module in the VoiceBot call processor; and if the VoiceBot call is authenticated, incorporate an indication of authentication into the VoiceBot call such that the indication of authentication is accessible to the call recipient before the VoiceBot call is answered by the recipient, wherein the indication of authentication indicates legitimacy of the VoiceBot call, wherein the incoming call processing module further communicates with a centralized authority and/or a centralized network database, the centralized authority authorizes various attributes associated with the VoiceBot call to provide the indication of authentication to the call recipient and the centralized network database delivers the indication of authentication to the call recipient using out-of-band signaling to deliver the indication of authentication to the recipient separate from information delivered within call control signaling.

16. A computer for authenticating VoiceBot calls prior to delivering the VoiceBot calls to a call recipient, wherein a VoiceBot call is a call made by an artificial intelligence (AI)-powered solution that interacts with users through spoken language on a call, the computer comprising:

one or more memories;

one or more processors, communicatively coupled to the one or more memories, the one or more processors configured to:

receive an incoming VoiceBot call at a VoiceBot call processor of an incoming call processing module in communication with network equipment;

authenticate the received VoiceBot call at an authentication module in the VoiceBot call processor; and if the VoiceBot call is authenticated, incorporate an indication of authentication into the VoiceBot call such that the indication of authentication is accessible to the call recipient before the VoiceBot call is answered by the recipient, wherein the indication of authentication indicates legitimacy of the VoiceBot call, wherein the incoming call processing module further communicates with a centralized authority and/or a centralized network database, the centralized authority authorizes various attributes associated with the VoiceBot call to provide the indication of authentication to the call recipient and the centralized network database delivers the indication of authentication to the call recipient using out-of-band signaling to deliver the indication of authentication to the recipient separate from information delivered within call control signaling.

17. The method of claim 1, wherein authenticating comprises authenticating an artificial intelligence VoiceBot system as the calling party.

* * * * *